(12) United States Patent
Bitar (10) Patent No.: US 12,240,186 B2
(45) Date of Patent: Mar. 4, 2025

(54) METHOD FOR PRODUCING AN ADHESIVE JOINT (71) Applicant: Ivoclar Vivadent AG, Schaan (LI)

(72) Inventor: Nicola Bitar, Montlingen (CH)

(73) Assignee: Ivoclar Vivadent AG, Schaan (LI)

(*) Notice: Subject to any disclaimer, the term of this patent is extended or adjusted under 35 U.S.C. 154(b) by 0 days.

(21) Appl. No.: 17/469,924

(22) Filed: Sep. 9, 2021

(65) Prior Publication Data

US 2022/0088887 A1 Mar. 24, 2022

(30) Foreign Application Priority Data

Sep. 23, 2020 (EP) .................................... 20197815

(51) Int. Cl.
*B29C 65/82* (2006.01)
*B29C 65/48* (2006.01)

(52) U.S. Cl.
CPC ...... *B29C 65/8292* (2013.01); *B29C 65/4845* (2013.01)

(58) Field of Classification Search
CPC ............. B29C 65/8292; B29C 65/4845; F16B 11/006; C09J 2301/416; C09J 5/00
See application file for complete search history.

(56) References Cited

U.S. PATENT DOCUMENTS

| | | | |
|---|---|---|---|
| 4,740,146 A | 4/1988 | Angelbeck | |
| 5,062,299 A | 11/1991 | Davis et al. | |
| 5,630,982 A | 5/1997 | Boring | |
| 5,951,163 A | 9/1999 | Jen et al. | |
| 6,448,337 B1 * | 9/2002 | Gaddam | C09J 7/385 525/218 |
| 6,541,778 B1 | 4/2003 | Jankowiak et al. | |
| 6,838,670 B2 | 1/2005 | Lewis et al. | |
| 8,440,974 B2 | 5/2013 | Ruhge et al. | |
| 2004/0026023 A1 | 2/2004 | DeMeter | |
| 2006/0266119 A1 | 11/2006 | Cobb | |
| 2016/0068718 A1 | 3/2016 | Suwa et al. | |

FOREIGN PATENT DOCUMENTS

KR 20160107023 A * 9/2016

OTHER PUBLICATIONS

Alig et al., "Polymerization and network formation of UV-curable materials monitored by hyphenated real-time ultrasound reflectometry and near-infrared spectroscopy (RT-US/NIRS)", Progress in Organic Coatings, vol. 55, Issue 2, 2006, pp. 88-96. (Year: 2006).*

Bak et al., "Simultaneous time-resolved measurement of the reaction rates and the refractive index of photopolymerization processes", Applied Optics, vol. 49, No. 17, Jun. 10, 2010. (Year: 2010).*

(Continued)

*Primary Examiner* — Christopher W Raimund
(74) *Attorney, Agent, or Firm* — Ann M. Knab; Thad McMurray (57) ABSTRACT The present invention relates to a method for producing an adhesive bond, comprising the steps of curing (S101) a light-curing adhesive material by means of light; detecting (S102) a degree of polymerization of the adhesive material; and terminating (S103) the curing at a specified degree of polymerization.

11 Claims, 5 Drawing Sheets

(56) References Cited

OTHER PUBLICATIONS

ArtResin, "How to harden Sticky Resin", https://www.artresin.com/blogs/artresin/oh-sh-t-series-episode-1-sticky#:~:text=a%20fresh%20coat.-,Sticky%2C%20tacky%20resin,a%20fresh%20coat%20of%20resin, Oct. 8, 2019. (Year: 2019).*

Abet Technologies, "UV Exposure Sources", Apr. 2013, https://abet-technologies.com/more-products/uv-exposure-sources/. (Year: 2013).*

* cited by examiner

METHOD FOR PRODUCING AN ADHESIVE JOINT

CROSS-REFERENCE TO RELATED APPLICATIONS

This application claims priority to European patent application No. 20197815.2 filed on Sep. 23, 2020, the disclosure of which is incorporated herein by reference in its entirety.

TECHNICAL FIELD

The present invention relates to a method for producing a light-curing adhesive bond and a manufacturing device for producing a light-curing adhesive bond.

U.S. Pat. Nos. 8,440,974, 6,838,670, 6,541,778, 5,630,982, 4,740,146, 5,062,299, 5,951,163 and 20060266119 are directed to ultrasonic-type testing and/or monitoring and are incorporated herein by reference in their entirety. US 2004026023 and 2016068718 are directed to bonding and are incorporated herein by reference in their entirety.

SUMMARY

It is the technical aim of the present invention to produce an adhesive bond in a short time and with a low energy input. In addition, it is an intention of the present invention to monitor and control a bonding process. These technical objectives are achieved by the objects according to the independent claims. Advantageous designs are subject of the dependent claims, description, and figures.

According to a first aspect, the technical problem is solved by a method for producing an adhesive bond, comprising the steps of curing a light-curing adhesive material by means of light; detecting a degree of polymerization of the adhesive material; and terminating the curing at a specified degree of polymerization. This allows the curing method to be stopped when the adhesive bond has sufficient strength. It is not necessary to cure the adhesive bond over a predetermined period of time. The adhesive bond can therefore be produced faster than with conventional methods. The method differs from other bonding methods in that the exposure is controlled by the bonding condition. In addition, non-destructing quality tests are possible, wherein a non-functioning adhesive bond can be sorted out without the need for an additional test.

In a technically advantageous embodiment of the method, the degree of polymerization is measured continuously during curing. This has the technical advantage, for example, that the curing process can be stopped immediately when the specified degree of polymerization is reached.

In another technically advantageous embodiment of the method, the degree of polymerization is measured by means of an ultrasonic method. This has the technical advantage, for example, that the condition of the adhesive bond can be determined precisely.

In a further technically advantageous embodiment of the method, the ultrasonic method comprises a sound velocity measurement, a sound resonance measurement and/or a sound level measurement. This has the technical advantage, for example, that particularly suitable methods are used to measure the degree of polymerization. In this way, the degree of polymerization of the adhesive material can be determined exactly so that an adhesion of the bond can be derived.

In another technically advantageous embodiment of the method, an initial value of the degree of polymerization is determined before the start of curing. This has the technical advantage, for example, that the degree of polymerization can be precisely determined based on an initial state of the adhesive material. The initial value is taken as a reference value at the beginning, for example, so that fluctuations in the coupling or in the material can be masked out. In this way, fluctuations in the base material can be determined and excluded. In addition, the behavior of the entire system can be determined, for example the workpiece-specific geometry, the thickness of the adhesive layer, or the presence of air bubbles.

In a further technically advantageous embodiment of the method, the current degree of polymerization is calculated based on the initial value. For example, a differential value is calculated from a later measured degree of polymerization and the initial value. If the difference value exceeds a given value, there is sufficient polymerization and thus hardening of the bonded joint. This also has the technical advantage that the degree of polymerization of the adhesive material can be determined exactly based on an initial state.

In another technically advantageous embodiment of the method, hardening is carried out using several light sources. This also has the technical advantage, for example, that the adhesive bond can be hardened evenly from several points. For example, the degree of polymerization can be determined in spatial resolution so that only light sources are activated at those points where the degree of polymerization has not yet reached the specified value.

In another technically advantageous embodiment of the method, curing is terminated if the specified degree of polymerization is not achieved within a specified time. This has the technical advantage, for example, that energy is not wasted if the adhesive bond can no longer be produced. In addition, a quality criterion is achieved by which components with defective adhesive bonds can be sorted out. It is also possible to search for the cause regarding the component and decide whether a larger batch is affected.

In a further technically advantageous embodiment of the method, the maximum degree of polymerization recorded and/or the polymerization process is stored as digital values. This provides the technical advantage, for example, that the digital value can be assigned to a specific component for quality assurance purposes and can be further processed in the subsequent process. The stored data can be accessed in case of complaints.

According to a second aspect, the technical problem is solved by a manufacturing device for producing a light-curing adhesive bond, comprising a light source for curing a light-curing adhesive material by means of light; a detection device for detecting a degree of polymerization of the adhesive material; and a control device for terminating the curing at a specified degree of polymerization. The manufacturing device provides the same technical advantages as the first aspect method. The main control unit, for instance, may be, but is not limited to, a central processing unit (CPU), a programmable logic controller (PLC) and/or other units with computing power.

In a technically advantageous embodiment of the manufacturing device, the manufacturing device comprises several light sources. This provides the technical advantage, for example, that the curing of the adhesive bond can be performed evenly.

In a further technically advantageous embodiment of the manufacturing device, the detection device is formed by an ultrasonic device for carrying out a sound velocity measurement, a sound resonance measurement and/or a sound level measurement. This also provides the technical advantage that the condition of the bonded joint can be precisely determined.

In a further technically advantageous embodiment of the manufacturing device, the manufacturing device comprises a digital memory for storing the recorded maximum degree of polymerization and/or a polymerization course as digital values. This also provides the technical advantage that the digital value can be assigned to a specific component for quality assurance purposes and can be further processed in the subsequent method.

In another technically advantageous embodiment of the manufacturing device, the control device is designed to stop curing if the specified degree of polymerization is not achieved within a specified time. This also has the technical advantage, for example, of preventing energy and time from being wasted if the adhesive bond can no longer be produced.

In another technically advantageous embodiment of the manufacturing device, the control device is designed to determine an initial value of the degree of polymerization before the start of curing and to calculate the actual degree of polymerization based on the initial value. The initial value measured before exposure is set as zero point. The change measured during exposure can then be used as a criterion for terminating the hardening process.

This also has the technical advantage, for example, that the degree of polymerization can be precisely determined based on an initial state. In this way, fluctuations in the base material can be determined and compensated.

BRIEF DESCRIPTION OF THE DRAWINGS

Execution examples of the invention are shown in the drawings and are described in more detail below.

They show.

DETAILED DESCRIPTION

Figure 1:
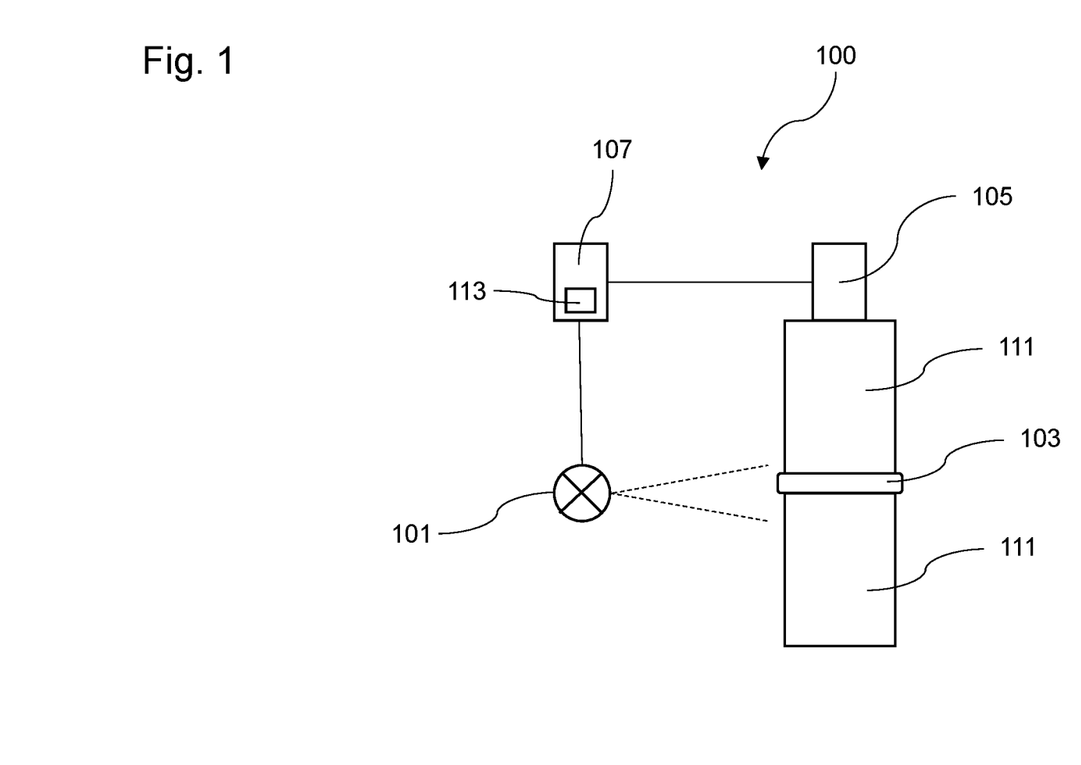
FIG. 1 a schematic view of a manufacturing device for producing a light-curing adhesive bond.

FIG. 1 shows a schematic view of a manufacturing device 100 for producing a light-curing adhesive bond between two components 111. For this purpose, a light-curing adhesive material 103 is placed between the two components 111. The light-curing adhesive material 103 is a polymeric material that polymerizes, for example, when irradiated with ultraviolet light and thus cures (UV-curing adhesive). The light is provided by an electrical light source 101, such as a light-emitting diode, which can be activated and deactivated by an electrical control device 107. In general, the manufacturing device 100 can also be equipped with several light sources 101, which are arranged around the bonding area.

The light-curing adhesive material 103 is, for example but not limited to, an adhesive based on urethane methacrylate that cures at room temperature when exposed to ultraviolet light. The light can have a wavelength between 1 um and 10 nm.

An ultrasonic method is used to determine a degree of polymerization of adhesive material 103. The degree of polymerization can be the percentage of monomeric units that were subject to a polymerizing reaction. For example, the higher a measured sound level is, the higher is the degree of polymerization of the adhesive material 103. Curing of adhesive material 103 can be terminated if the measured sound level does not rise any more over time. In this case the degree of polymerization of adhesive material 103 is 100%, i.e., the adhesive material 103 is completely cured.

However, curing of adhesive material 103 can also be terminated if the measured sound level is at a given percentage of the expected maximum value. This corresponds to a degree of polymerization at the same given percentage. In this case curing of adhesive material 103 can be terminated if the measured sound level is at 90%, 95% or 99% of the expected maximum value. This corresponds to a degree of polymerization of 90%, 95% or 99%, respectively. U.S. Pat. No. 11,067,841 which discusses degree of polymerization is hereby incorporated by reference in its entirety.

The ultrasonic waves are coupled into one of the components 111 by means of a detection device 105, such as an ultrasonic sensor with an ultrasonic head as actuator. To determine the degree of polymerization of the adhesive material 103, a sound velocity measurement, sound resonance measurement or sound level measurement is carried out during exposure to the ultraviolet light. The ultrasonic measurement can be based on a transmitted sound or a pulse-echo method.

To determine the degree of polymerization, an initial value is first determined by ultrasonic measurement at which no light-induced polymerization of adhesive material 103 has yet taken place. The initial value corresponds to a degree of polymerization of zero. Then the light source 101 is activated. Then the control device 107 monitors by which amount the initial value increases. As soon as the continuously measured value exceeds the initial value by a specified amount, the light source is deactivated by the control device 107.

The ultrasonic measurement is thus carried out from the beginning to the end of the exposure, so that a difference between the original initial value and the subsequent measured value can be determined. The initial value can also be used to test the adhesive material 103 in the unpolymerized state, so that, for example, the quantity of adhesive material 103 applied can be determined.

With the manufacturing device 100 the exposure is not stopped after a fixed time, but on the basis of an ultrasonic speed measurement, resonance measurement or level measurement, if its measurement exceeds or falls below the specified or predetermined threshold value. Therefore, there is no time-controlled termination based on a fixed preset time, but a termination based on a degree of polymerization to be achieved, which corresponds to the adhesion at the bonding site. The exposure is therefore terminated based on an ultrasonic level being exceeded or sound velocity measurement which proves sufficient curing and adhesion of the adhesive material 103. In the ultrasonic method, a change in the measured value is used as a switch-off criterion (activation of the adhesive for polymerization).

As a result, the manufacturing device 100 polymerizes the adhesive material 103 faster and with better quality. If the degree of polymerization is recorded continuously during curing, active monitoring of the polymerization can be carried out, allowing a user to follow the bonding process and monitor the progress of the bonding method.

The control device 107 can also include a digital memory 113, in which the recorded maximum degree of polymerization for each component 111 is stored as a digital value. The digital memory 113 is, for example, an electronic memory module or a hard disk. This means that the quality of the adhesive bond can be checked for each component 111 in a manufacturing process and stored in a data record in conjunction with the corresponding component. The data record can be further processed during the manufacturing process.

Figure 2:
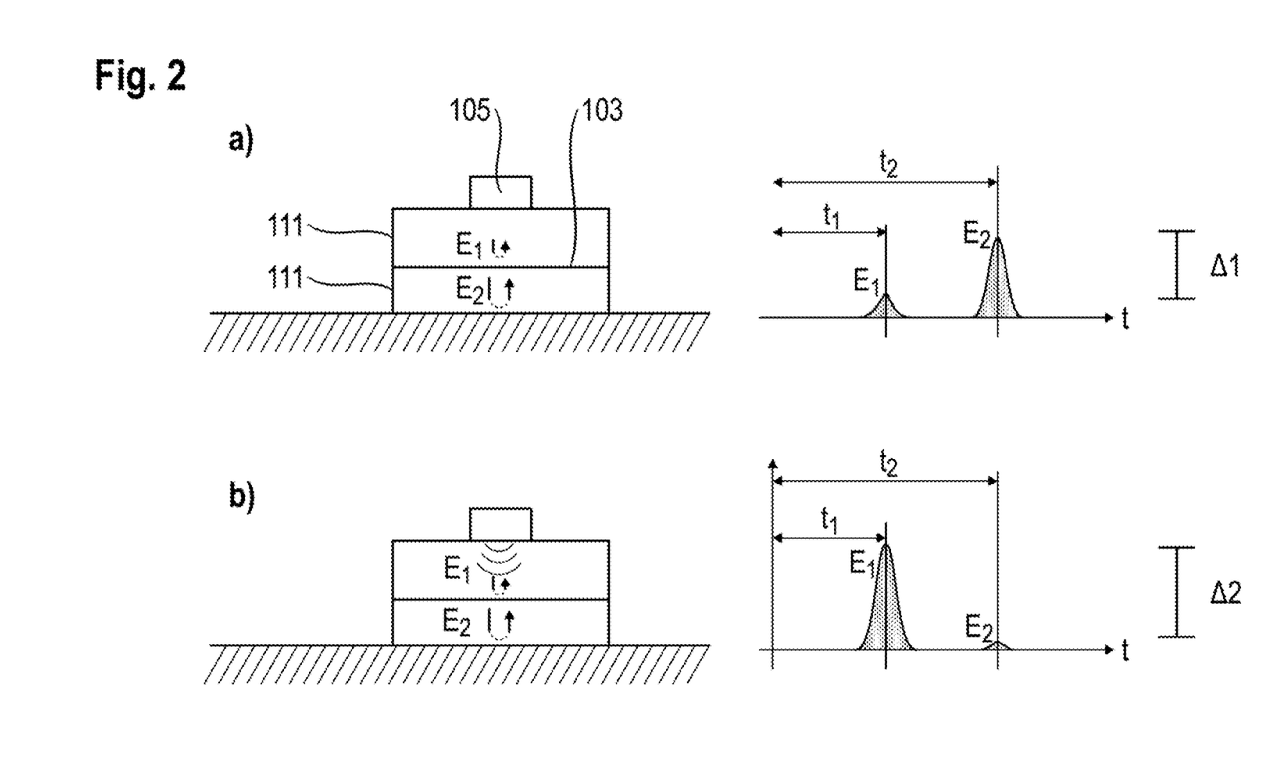
FIG. 2 an interface evaluation using a pulse-echo method.

FIG. 2 shows a boundary surface evaluation of the adhesive bond using a pulse-echo method. A transducer as detection device 105 is in mechanical contact with the upper component 111 and radiates the ultrasonic waves into the components 111 with the adhesive material 103.

In case a) the value E1 is measured at a time T1. At time T2 during or after an exposure, the value E2 is measured, which exceeds the value E1 by an amount $\Delta 1 = E2 - E1$. This is due to the fact that through the cured adhesive material 103 the ultrasonic waves are transmitted into the lower component 111 and are transmitted from the lower interface.

If this amount Al is above a predetermined or specified value $\Delta_{SOLL}$, sufficient polymerization and curing of the adhesive material 103 is indicated. A direct comparison of the previous value E1 with the subsequent value E2 allows a better conclusion to be drawn about the adhesion and polymerization of the adhesive material 103. This results in independence from product differences, since the height of the dimples and the partition echo divergences can be hidden.

In case b) the value E1 is also measured at a time T1. At time T2 during or after an exposure, the value E2 is measured, which falls below the value E1 by an amount $\Delta 2 = E2 - E1$. In this case, the adhesive bond between the components is sufficient and no ultrasonic waves are transmitted into the lower component 111. In this case, insufficient polymerization and curing of the adhesive material 103 is indicated and the exposure is stopped.

Figure 3:
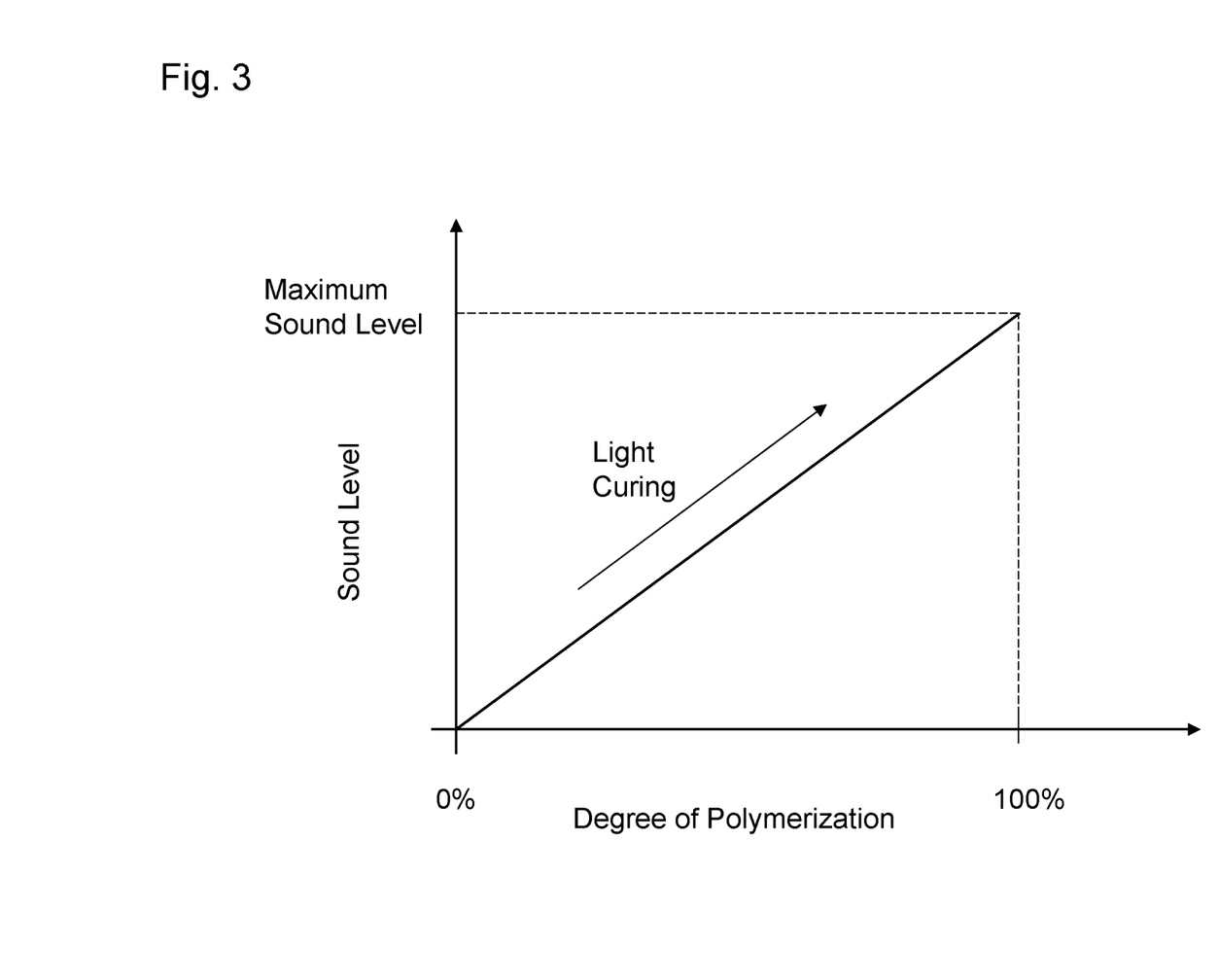
FIG. 3 a relationship between the polymerization degree and a sound level.

FIG. 3 shows a principal relationship between the degree of polymerization and a sound level. The higher the degree of polymerization, the higher the sound level. Thus, the measured sound level indicates the degree of polymerization. If the sound level is at a maximum value, the degree of polymerization is at 100% and the adhesive material 103 is completely cured.

The shown relationship can be used to determine the degree of polymerization from the sound level and vice versa.

Figure 4:
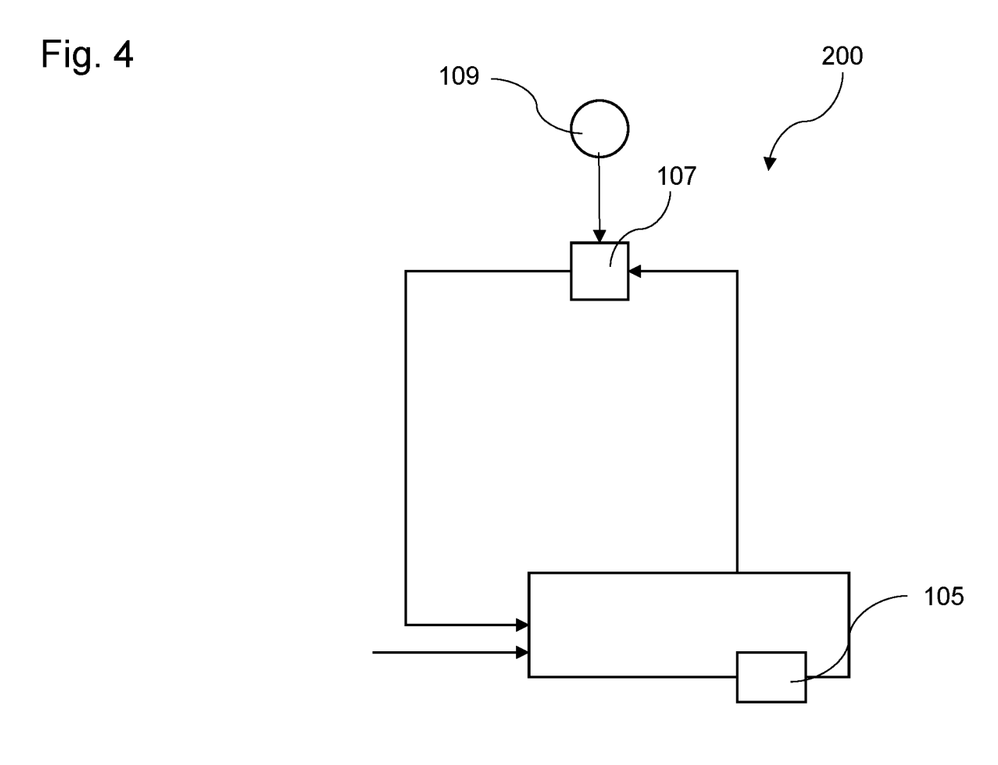
FIG. 4 a control loop to control an exposure.

FIG. 4 shows a control loop 200 for controlling an exposure. The measured value for the degree of polymerization is transmitted to a controller of the control unit 107 and compared with a reference variable 109 which corresponds to the specified degree of polymerization. As soon as the measured value exceeds the degree of polymerization, the light source 101 is deactivated.

Figure 5:
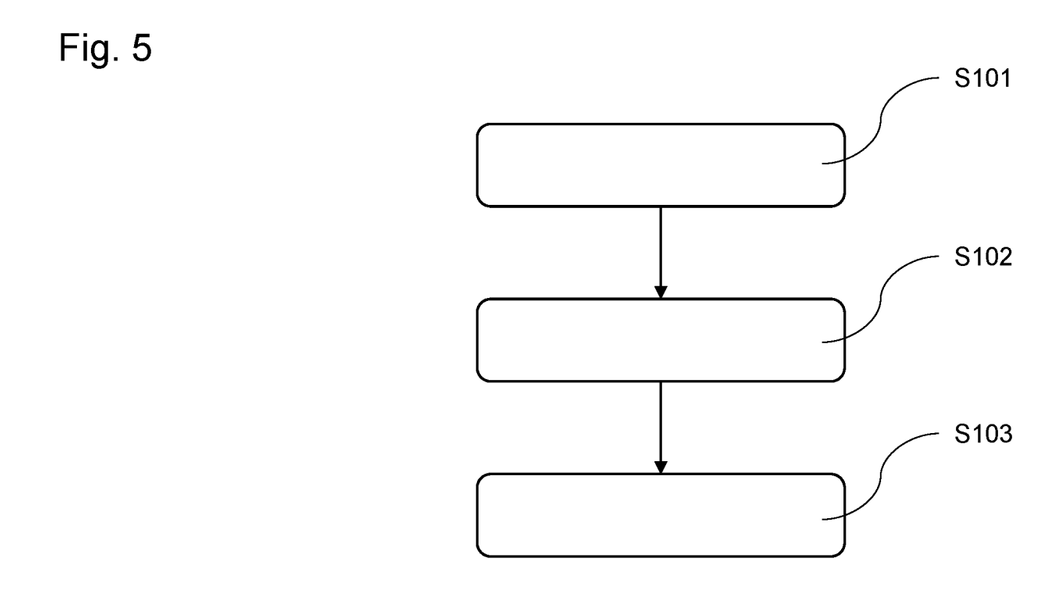
FIG. 5 a block diagram of a method for producing an adhesive bond.

FIG. 5 shows a block diagram of a method for creating the adhesive bond between components 111. In the first step S101, the light-curing adhesive material 103 is cured by light. In step S102, the degree of polymerization of the adhesive material 103 is detected by the detection device 103. In step S103, the curing is stopped when a specified degree of polymerization is reached, i.e. when a specified adhesion to the bonding site is achieved.

This results in a direct concatenation of the exposure to UV-light with an ultrasonic measurement, so that the achievement of the desired final strength of the adhesive material 103 can be measured. If this final strength is not reached within a certain specified period of time, a quality instability in the adhesive during manufacturing can be detected. This can be used as an additional reject parameter during manufacturing and can also be stored in the digital memory 113 in connection with the component.

A specified sonic behavior of the ultrasonic level measurement is defined as the end of the exposure time. An ultrasonic velocity measurement, resonance measurement or level measurement that exceeds or falls below the specified threshold value terminates the exposure process. This procedure is used to measure the polymerization of the adhesive material 103 and, depending on the degree of polymerization achieved, the light is switched off. By actively terminating the exposure, the procedure ensures an optimized bonding time or exposure time, thus saving time.

This saves time when producing the adhesive bond, as there is no need to plan for reserve times for reliable curing. At the same time, non-destructive testing of the adhesive bond is carried out. In addition, polymerization (strength) of the adhesive material 103 can be detected, allowing qualitative statements to be made about polymerization and stored as digital values.

If the specified degree of polymerization $\Delta_{SOLL}$ is not achieved within a specified time, curing can also be actively terminated. This allows a reject criterion to be defined for the components 111 to be bonded. In this way, material defects such as bubbles or cracks in the material can be detected.

This enables a quality control of the bonded joint, so that a final inspection can be omitted, during which sufficient adhesion of the bonded joint is checked. This reduces the potential testing effort, since, for example, a shear test on a system can be omitted.

The bonding method can be used in the dental field, for example with polymerizable composite materials, filling materials and cements. However, the bonding method can also be used for industrial bonding, such as for cell phones or in the automotive industry.

All features explained and shown in connection with individual embodiments of the invention may be provided in different combinations in the subject-matter of the invention to simultaneously realize their beneficial effects.

All method steps can be implemented by means that are suitable for carrying out the respective method step. All functions, which are executed by objective features, can be a method step of a procedure.

In some embodiments, the system may include a processor, an electronic data storage unit, and a display. The processor can be a single processor having one or more cores, or a plurality of processors connected by a bus, network, or other data link. The electronic data storage unit can be any form of non-transitory computer-readable storage medium suitable for storing the data produced by the system. The display can be any display suitable for displaying a digital color or grayscale image.

In some embodiments, the processor, electronic data storage unit, and digital display are components of a single device. The single device may be a smartphone, tablet, laptop computer, personal digital assistant, or other computing device.

In some embodiments, the processor is in communication over a network, which could be wired or wireless, with an external processor used for performing one or more calculation steps and/or a network-attached electronic data storage unit.

In some embodiments, the present disclosure makes use of cloud computing to perform one or more calculations steps remotely and/or remote storage to enable the storage of data remotely for collaborative or remote analysis.

In some embodiments, the system comprises a plurality of graphical user interfaces to permit multiple users to view or analyze the same data.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

"Computer" is not limited to physical desktop computers. Such computers may include virtual machines running on local or remote servers. The computing power may be increased by combining or bridging at least two or a plurality of such machines, if required.

Also, any kind of mobile devices, such as notebooks, laptops, tablets and smartphone may be used as computers. Such computers usually comprise all or at least several of the components mentioned above.

It is also possible to use a local computer having access to a local or remote database, and any of the above mentioned mobile devices having access to the same database, intended to share tasks between local and mobile devices.

Although the invention is illustrated above, partly with reference to some preferred embodiments, it must be understood that numerous modifications and combinations of different features of the embodiments can be made. All of these modifications lie within the scope of the appended claims.

The scope of protection of the present invention is given by the claims and is not limited by the features explained in the description or shown to the figures.

REFERENCE SIGN LIST

100 Manufacturing device
101 Light source
103 Adhesive material
105 Recording device
107 Control device
109 Reference variable
111 Component
113 Digital memory
200 Control loop

The invention claimed is:

1. A method for producing an adhesive bond, comprising the steps:
   curing (S101) a light-curing adhesive material (103) by light;
   detecting (S102) a degree of polymerization of the adhesive material (103) to determine if a specified degree of polymerization is reached that is required to achieve adhesion to a bonding site; and
   wherein the determination of the degree of polymerization is carried out by an ultrasonic method using a sound velocity measurement, a sound resonance measurement and/or a sound level measurement; and
   terminating the curing if the measurement falls below a predetermined threshold value.

2. The method according to claim 1, wherein the determination of the degree of polymerization is carried out continuously during the curing process.

3. The method according to claim 1, wherein an initial value of the degree of polymerization is determined before the start of curing.

4. The method according to claim 1, wherein a current degree of polymerization is calculated based on the initial value.

5. The method according to claim 1, wherein curing comprises hardening performed by several light sources (101).

6. The method according to claim 1, wherein a detected maximum degree of polymerization and/or a course of polymerization is stored as a digital value.

7. A manufacturing device (100) for producing a light-curing adhesive bond, comprising:
   a light source (101) for curing a light-curing adhesive material (103) by light;
   a detection device (105) for detecting a degree of polymerization of the adhesive material (103); and
   a control device (107) for terminating the curing at a specified degree of polymerization, wherein the control device is configured to terminate the curing if the specified degree of polymerization is not achieved within a specified time.

8. The manufacturing device (100) according to claim 7, wherein the manufacturing device (100) comprises a plurality of light sources (101).

9. The manufacturing device (100) according to claim 7, wherein the detecting device (105) comprises an ultrasonic device for performing a sound velocity measurement, a sound resonance measurement and/or a sound level measurement.

10. The manufacturing device (100) according to claim 7, wherein the manufacturing device (100) comprises a digital memory (113) for storing the detected maximum degree of polymerization and/or a polymerization course as digital values.

11. The manufacturing device (100) according to claim 7, wherein the control device (107) is configured to determine an initial value of the degree of polymerization before a start of curing and to calculate the actual degree of polymerization based on the initial value.

* * * * *